United States Patent Office 3,335,601
Patented Aug. 15, 1967

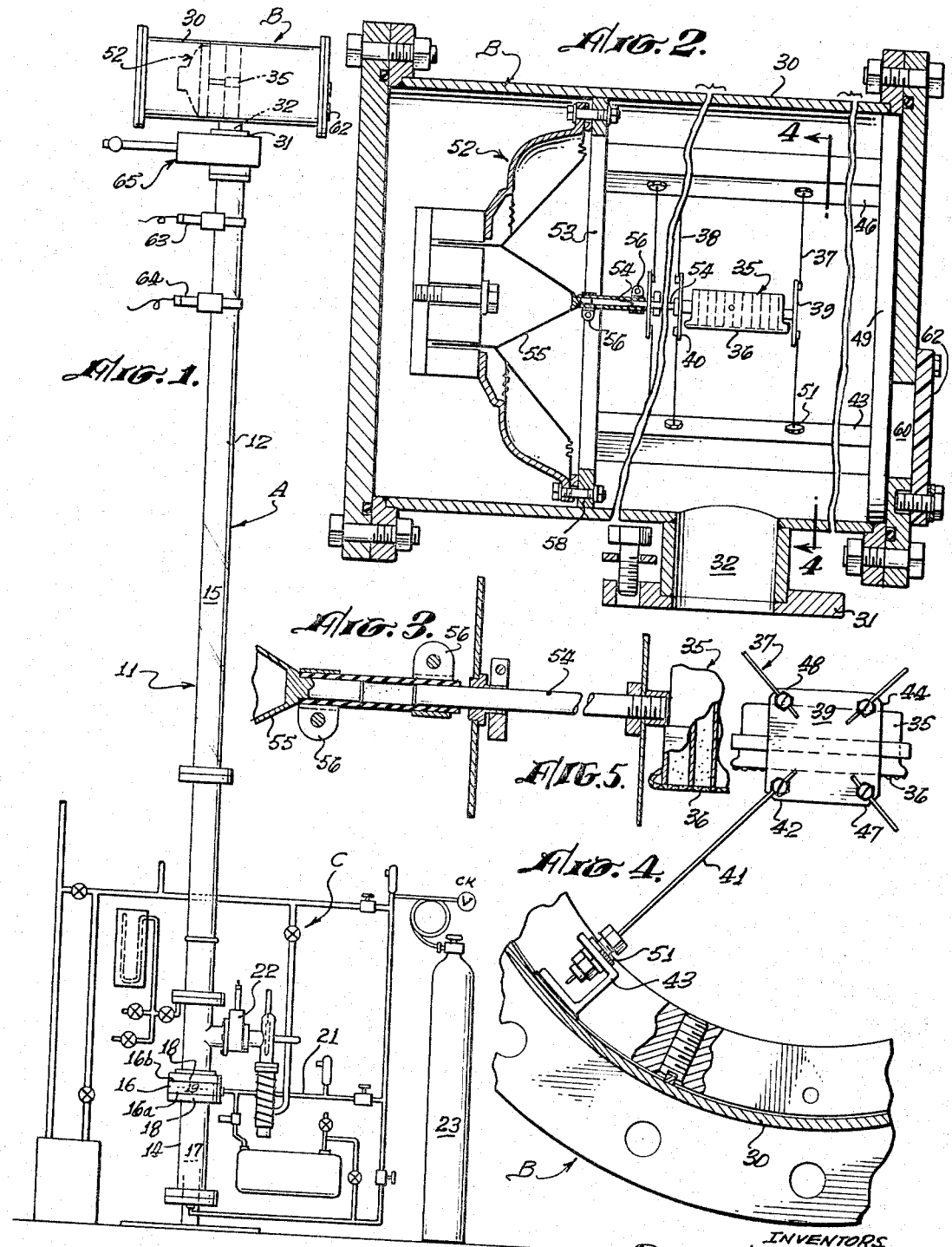

3,335,601
SHOCK CHAMBER
Saul Feldman, Hollywood, and Roy S. Hickman, Woodland Hills, Calif., assignors to Heliodyne Corporation, Los Angeles, Calif., a corporation of California
Filed May 28, 1963, Ser. No. 283,781
4 Claims. (Cl. 73—12)

This invention relates to apparatus for subjecting particulate material to high temperature shock waves and more particularly to apparatus for ablating particulate material by shock accelerations.

The problems of ablation of various materials and the reactions of such materials to extreme high temperatures and shock erosion forces has become increasingly important with the advent of extremely high speed vehicles and other projects where materials are subjected to shock erosion forces and temperatures not heretofore encountered.

The present invention provides apparatus for obtaining information on the chemical kinetics and electron production mechanisms of high temperature atmospheres contaminated with engineering ablation materials and the effect of shock induced high temperatures on particular materials thereby subjected to ablation. In the present state of the art, methods involving the use of arc jets or ballistic ranges have been utilized to obtain such information but such methods and apparatus are unsatisfactory due to the complexity of the apparatus and further calculations required to be performed upon the information obtained from such methods, which calculations involve assumptions, simplifications and estimates which make the end results suspect.

A primary difficulty of all present art methods for determining the effect of contaminants during high temperature and shock conditions is the fact that present art methods introduce chemical contamination from the equipment used. It has been found, in accordance with the present invention, that by intimately mixing a material of interest in finely divided particulate form with an atmosphere of interest, and subjecting the mixture to a shock wave the shock gradients can be restricted to only one direction, during most of the travel of the shock wave. The flow can be maintained in a laminar condition and the effect of the shock wave can be monitored and studied at various phases. Thus, in accordance with the present invention when the shock wave passes through the intimate mixture containing only the materials desired, the shock wave accelerates the particles in the mixture to near the velocity of the shock wave and heats the particles. The stagnation heat transfer rates for micron size particles has been found to be between $10^5$ and $10^6$ B.t.u./ft.$^2$ sec. at shock velocities of the order of 6 mm./$\mu$sec. leading to substantially instantaneous vaporization of the intimately mixed material. Thus, for ablating materials of a glassy type the vaporization time is of the order of microseconds. During progress of the shock wave through the mixture the particulate material will ablate, diffuse radially (thus forming a mixture with negligible radial gradients) and the production and breakup of chemical species can be monitored from the time of the shock wave arrival. The electron number density and radiation emission can be monitored by spectroscopic and electron density measuring instrumentation of the type well known to the art.

Thus, the present invention provides apparatus for determining the radiation intensity, electron density, temperature, chemical composition, chemical structure, and the like of materials subjected to high temperature conditions in a predetermined environment, and also provides means for determining what final and intermediate products or compounds are formed during such reactions.

It is a primary object of the present invention to provide an improved apparatus for subjecting predetermined materials to shock induced high temperatures in a predetermined environment.

It is another object of the present invention to provide apparatus for ablating materials in order that the properties of such materials in the gaseous phase with air or a controlled atmosphere can be determined and the intermediate properties and phenomena can be determined.

A further object of the present invention is to provide apparatus for ablating materials wherein no contaminants are introduced by the method or apparatus.

Another object of the present invention is to provide apparatus wherein the material to be ablated can be injected and controlled in kind and to predetermine its relative concentration as an independent variable.

Yet another object of the present invention is to provide apparatus in which more meaningful results are obtained than has heretofore been possible by the prior art.

The present invention comprises dispersing a material in particulate form throughout an enclosed chamber and subjecting the material to a shock wave while so dispersed. The apparatus of the present invention includes a body defining a vertical first chamber and a second closed chamber, adjacent to said first chamber, the chambers being divided by a barrier which can be removed at a predetermined time. Means are provided for introducing the material into the first chamber in an evenly dispersed condition such that the material is subject primarily to gravity forces.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:
FIGURE 1 is a partially schematic view of a presently preferred embodiment of the present invention;
FIGURE 2 is a detail view, partially in section, of the injection mechanism of the present invention;
FIGURE 3 is an enlarged partial view in accordance with FIGURE 2;
FIGURE 4 is an enlarged partial view in perspective taken along line 4—4 of FIGURE 2; and,
FIGURE 5 is a partial enlarged view of FIGURE 2.

Although not limited thereto the present invention has been found to be particularly suited to subjecting materials to shock acceleration forces to determine the ablation effects upon such materials and will accordingly be described in connection with such use. It is to be understood that the present invention is adaptable to various uses and applications such as the transformation of materials from one phase, condition, or chemical composition to another by reason of shock induced high temperatures and rapid expansions which can be used as a quenching mechanism. Although discussed in connection with solid materials in particulate form the term particulate material also applies to liquids.

In its presently preferred form the apparatus of the present invention includes in general terms a shock tube A, an injection mechanism B, and a loading section C. The shock tube 11 is of the type known to the art which includes an elongated retort made from two pipe sections 12 and 14 of the same diameter connected together by bolts and flanges. A rupturable diaphragm section 16 of metal or other suitable material which will withstand the necessary pressure loads on one face thereof and rupture at a predetermined load separates the tube sections 12 and 14 which define the reaction chamber 15 and the driver chamber 17. In the illustrative embodiment the tubes 12 and 14 utilized to form the shock tube are approximately 3 inches in side diameter with a wall thickness suitable to withstand the pressures to be employed. The tube section 12 defines the reaction chamber 15 and is approximately 18 feet in length. The tube section 14 defines the high pressure driver chamber 17 and is approximately 18 inches in length. The tube sections are joined by flanges which provide means for inserting the rupturable diaphragm section 16. In the present embodiment a double diaphragm has been employed to allow greater control at high pressure differentials. For example, a pressure of 2500 p.s.i. is a typical pressure to be employed in the driver chamber while a typical pressure employed in the reaction chamber is substantially atmospheric or below such as approximately 1 cm. of mercury. In order to facilitate the rupture of the diaphragm and the timing of the passage of the shock wave two diaphragms 16a and 16b are spaced apart by means of flanges 18 to thus define a chamber therebetween. In the chamber designated the diaphragm chamber 19 an intermediate pressure of 1000 pounds can be employed such that the pressure differential existing between the surfaces of the first diaphragm 16a is 1500 p.s.i. and across the second diaphragm 16b is 1000 p.s.i. A gas conduit 21 is then affixed in communicaiton with the diaphragm chamber 19. Suitable means such as a solenoid operated valve are provided for dumping the gas from the diaphragm chamber substantially instantaneously. Thus, when the gas is exhausted from the diaphragm chamber 19 the pressure differential across the first diaphragm 16a is 2500 p.s.i. Both the diaphragms 16a and 16b are formed of a material and of a thickness which will rupture at a pressure greater than 1500 p.s.i. but less than 2500 p.s.i. such that when the pressure is dumped from the diaphragm chamber 19 the first diaphragm 16a ruptures followed by rupture of the second diaphragm 16b.

Associated with the shock tube is auxiliary apparatus of the type well known to the art for loading the driving gas in to the driver chamber 17 from a source 23 through appropriate valving. A clean-up section 22 is provided at the lower end of the reaction chamber 15 for exhausting and cleaning the chamber and to pump down the chamber to any desired predetermined pressure. All such apparatus and instrumentation is well known to the art and is therefore not described in detail.

As discussed hereinbefore the shock tube A is vertically oriented and at the upper end thereof there is provided means in accordance with the present invention for evenly dispersing throughout the reaction chamber 15 the particulate material which is to be subjected to the shock reaction. It has been found in accordance with the present invention that it is essential to the operation of the apparatus that the material be injected evenly in a dispersed substantialy free falling condition. Referring now particularly to FIGURES 2, 3, 4 and 5 there is shown a presently preferred embodiment of the means for achieving such injection and dispersion of the material. A housing 30 is affixed by flanges 31 to the upper end of the shock tube 11 with an opening 32 in communication with the reaction chamber 15, the opening 32 having an inside diameter substantially equal to the inside diameter of the reaction chamber. The housing 30 is circular in cross-sectional configuration with the axis thereof horizontally oriented. Positioned within the housing 30 substantially symmetrically about the horizontal axis thereof is a particulate material container 35 with a lower surface 36 formed of fine mesh sieve material of the type well known to the art. The sieve material is dependent upon the size and type of particulate material to be dispersed. The particulate material container 35 is mounted within the housing 30 directly above the opening 32 with the vertical axis of the particulate material container 35 being coincident with the axis of the reaction chamber 15. As shown particularly in FIGURE 5, the container above the sieve material is formed to define a plurality of vertically oriented cavities, i.e., comparable to a honeycomb effect. Such vertically oriented walls prevent the accumulation of the particulate material in any localized areas to insure even dispersion from the entire sieve area. The container 35 is mounted for horizontal oscillating movement by means of spiders 37 and 38 each of which is formed by four wires in tension affixed at corners of a bracket 39 and 40 connected to opposite sides of the container 35 as shown particularly in FIGURES 2 and 4. Thus, referring to FIGURE 4 a length of high tensile strength wire 41 such as .020 diameter music wire is affixed to the corner 42 of the bracket 39 at one end of the wire while the other end thereof is affixed to the side wall of the housing 30 by means of a channel 43 removably mounted at the inside surface of the housing 30 on the diameter of the housing which passes through the corner 42 and the opposite corner 44 of the bracket 39. A similar channel 46 is mounted at the housing wall at the opposite point on the diameter and a length of wire is connected between the corner 44 and the channel 46. Wires are similarly connected at the corners 47 and 48 and connected to oppositely disposed channels at the wall of the housing on the diameter passing through the opposed corners. Means 51 are provided on each channel to tension the wires such that the four lengths of wire can be tightened to suspend the bracket 39 symmetrically about the longitudinal axis through the housing. The longitudinally extending channels 43, 46 are mounted by means of circumferential channels 53 and 49 at each end thereof by means of which the entire assembly is removably positioned within the housing.

To provide high frequency oscillatory movement a transducer is employed. In the present embodiment a permanent magnet loud speaker designated generally as 52 is employed with the speaker mounted within the housing 30 such that the axis of the speaker lies on the longitudinal axis of the housing. The speaker is affixed to the housing by suitable means such as the brackets 58 to which the speaker is bolted. The speaker cone is connected to the particulate container by means of a connecting member 54, shown in detail in FIGURE 3, which lies along the longitudinal axis of the housing. Adapter means are provided for affixing the connecting rod 54 to the speaker cone such that the oscillatory movement of the speaker cone is imparted through the connecting rod 54 to the particulate material container 35. In the embodiment shown a light weight cone 55 formed of aluminum is connected to the connecting rod by brackets 56 at the apex of the cone 55 while the base of the cone is connected to the speaker cone. When the speaker is actuated the oscillatory movement of the speaker cone is thus transmitted through the aluminum cone 55 to the connecting rod 54 and thus to the particulate material housing 35. In the presently preferred embodiment a 12 inch speaker of the type well known to the art is employed and an amplifier (not shown) of conventional construction is used to drive the speaker at the required frequency. In the presently preferred embodiment a 70 watt amplifier having a frequency range from 20 to 20,000 cycles per second is employed and the frequency transmitted to the particulate material container is dependent upon the particle size and rate of flow desired of the material to the reaction chamber. Thus, the rate of material dispersed into the reaction chamber can be varied by varying the frequency of the amplifier driving the permanent magnet speaker which in turn oscillates the particulate material container and the sieve at the frequency of the speaker. The oscillatory movement of the container and sieves causes the particulate material to be dispersed through the opening 32 in to the reaction chamber.

At the end of the housing 30 opposite the speaker there is an observation opening 60 defined through the wall which opening is covered by a transparent cover 62 formed of material such as lucite in order that dispersion of the material into the reaction chamber can be visually observed.

In order to avoid damage to the injector upon the occurrence of the shock wave means are provided for closing the upper end of the reaction chamber after dispersion of the material thereinto. The closure can take any of many forms but in the presently preferred embodiment a gate valve 65 of the type well known to the art is positioned just below the flange 31 of the injector. For some applications at the upper end of the reaction chamber there may be provided an exhaust opening through which the materials can pass after being subjected to the shock wave. A dump tank is then provided in communication with the exhaust opening. The dump tank is a reservoir adapted to receive the materials exhausted from the reaction chamber. To separate the tank volume from the reaction chamber means such as a thin diaphragm capable of withstanding only an atmospheric pressure differential existing between the dump tank and the reaction chamber when the reaction chamber is pumped down to sub-atmospheric condition is used. That is, during operation of the apparatus in which the reaction chamber is maintained in a sub-atmospheric condition the diaphragm serves only to avoid the necessity for pumping the dump tank down to the same sub-atmospheric condition. Means are provided for removing the material from the dump tank through a port to which a conduit and valve are connected.

Thus, in operation of the apparatus of the present invention any material capable of being reduced to particulate form can be subjected to a high temperature inducing shock wave in any predetermined atmosphere. The driver gas employed to generate the shock wave can be pure air to thus subject the particulate material to an uncontaminated shock wave condition comparable to that which it would encounter in a pure air atmosphere. However, the driver gas can take many forms and a combustible gas mixture such as $H_2+O_2$ can be utilized to raise the reaction temperature generated by the passage of the shock wave. As an illustrative example of the present invention phenolic fiberglass can be utilized as the ablating material to determine the thermodynamic data and the properties thereof when in gaseous phase with air by grinding the fiberglass to particle sizes of from .05 to 40 microns. Air is then used as the driver gas and the driver chamber 17 is loaded with air at a pressure of 2500 p.s.i. The particulate fiberglass is then loaded into the container 35 and the speaker 52 is energized when the shock tube is closed and ready for operation. The valve 65 is open. The particulate fiberglass falls through the opening 32 in dispersed free fall. The flow rate is determined by the concentration of material desired. When the desired concentration of material has been dispersed into the reaction chamber 15 the valve 65 is closed. The shock wave is then initiated by evacuating the chamber 19 between diaphragms 16a and 16b as described hereinbefore. The diaphragms then rupture and the shock wave travels into the reaction chamber. As the shock wave travels into the reaction chamber it reverses the direction of the falling particles and accelerates them upward. The front of the shock wave travels beyond the falling particles before accelerating them upward and various phases of the particles are present within the chamber, i.e., the fully heated and vaporized particles will be in gaseous form at about 7–9000° K. A region of the particles will be ablating and will be in a complex solid, liquid and gas phase. From the various phases and temperatures the electron production, radiation properties, final hot constituents and final chemical make-up can be determined.

What is claimed is:

1. Apparatus for shock inducing high temperatures upon a predetermined material comprising: a vertically oriented shock tube defining an upper reaction chamber and a lower driver chamber, rupturable diaphragm means separating said chambers, means for controlling the environment in said reaction chamber, means for introducing a predetermined gas under pressure into said driver chamber, injector means proximate the upper end of said reaction chamber for dispersing free falling particulate material into said chamber, means for rupturing said diaphragm means whereby a shock wave passing upwardly through said chamber and particulate material.

2. The apparatus defined in claim 1 in which said injector means comprises an oscillating sieve member for dispersing said particulate material.

3. The apparatus defined in claim 1 wherein said injector means comprises a housing affixed at the upper end of said shock tube, said housing defining an opening coextensive with an open upper end of said shock tube, a container for particulate material positioned within said housing above said opening, said container having a sieve-like lower surface through which said material can pass when said container is oscillated, means for positioning said container to allow horizontal oscillatory movement thereof, means for inducing said oscillatory movement.

4. The apparatus defined in claim 1 wherein said injector means comprises a housing affixed at the upper end of said shock tube, said housing defining an opening coextensive with an open upper end of said shock tube, a container for particulate material positioned within said housing above said opening, said container having a sieve-like lower surface through which said material can pass when said container is oscillated, means for positioning said container to allow horizontal oscillatory movement thereof, a speaker mounted in said housing with the axis of oscillation of said speaker concident with the axis of oscillation of said container, means connecting said speaker to said container whereby oscillation of said speaker induces oscillation of said container.

References Cited

UNITED STATES PATENTS

| | | | |
|---|---|---|---|
| 2,966,793 | 1/1961 | Mullaney et al. | 73—12 X |
| 3,087,332 | 4/1963 | Kern | 73—147 |
| 3,184,952 | 5/1965 | Humphreys | 73—12 |
| 3,240,689 | 3/1966 | Lauer | 204—156 |

JAMES J. GILL, *Acting Primary Examiner.*

R. QUEISSER, *Examiner.*

C. A. RUEHL, *Assistant Examiner.*